US011218776B2

(12) United States Patent
Yu et al.

(10) Patent No.: US 11,218,776 B2
(45) Date of Patent: Jan. 4, 2022

(54) METHOD FOR PUSHING VIDEO INFORMATION, APPARATUS, DEVICE AND STORAGE MEDIUM

(71) Applicants: BAIDU ONLINE NETWORK TECHNOLOGY (BEIJING) CO., LTD., Beijing (CN); SHANGHAI XIAODU TECHNOLOGY CO., LTD, Shanghai (CN)

(72) Inventors: Jingwen Yu, Beijing (CN); Hao Liang, Beijing (CN); Bingbing Fan, Beijing (CN)

(73) Assignees: BAIDU ONLINE NETWORK TECHNOLOGY (BEIJING ) CO., LTD.; SHANGHAI XIAODU TECHNOLOGY CO. LTD.

( * ) Notice: Subject to any disclaimer, the term of this patent is extended or adjusted under 35 U.S.C. 154(b) by 0 days.

(21) Appl. No.: 16/666,732

(22) Filed: Oct. 29, 2019

(65) Prior Publication Data
US 2020/0221185 A1    Jul. 9, 2020

(30) Foreign Application Priority Data
Jan. 3, 2019    (CN) .......................... 201910004501.X

(51) Int. Cl.
*H04N 21/482* (2011.01)
*H04N 21/442* (2011.01)
*H04N 21/83* (2011.01)

(52) U.S. Cl.
CPC ... *H04N 21/4826* (2013.01); *H04N 21/44218* (2013.01); *H04N 21/44222* (2013.01); *H04N 21/83* (2013.01)

(58) Field of Classification Search
CPC ......... H04N 21/4826; H04N 21/44218; H04N 21/44222; H04N 21/83
See application file for complete search history.

(56) References Cited

U.S. PATENT DOCUMENTS

| 10,200,761 B1* | 2/2019 | Christie | ............ H04N 21/4316 |
| 2004/0006509 A1* | 1/2004 | Mannik | ............. G06Q 30/0643 705/14.55 |

(Continued)

FOREIGN PATENT DOCUMENTS

| CN | 106060637 A | 10/2016 |
| CN | 107122397 A | 9/2017 |

(Continued)

OTHER PUBLICATIONS

First Office Action issued in CN Patent Application No. 201910004501.X dated Aug. 14, 2020.

(Continued)

*Primary Examiner* — Randy A Flynn
(74) *Attorney, Agent, or Firm* — Dilworth IP, LLC

(57) ABSTRACT

Embodiments of the present disclosure provides a method for pushing video information, an apparatus, a device and a storage medium. In the embodiments of the present disclosure, the user behavior information in the user page at the current moment is acquired, and the related information of the target video that is pushed to the user terminal at the next moment is determined according to the user behavior information, so that the user terminal refreshes the user page according to the related information of the target video, thus the target video that is pushed by the server to the user terminal is more in line with the user's preference, therefore the user quickly finds the video that he/she likes in the user interface, thereby improving the user experience.

15 Claims, 7 Drawing Sheets

(56) References Cited

U.S. PATENT DOCUMENTS

| | | | |
|---|---|---|---|
| 2009/0055742 A1* | 2/2009 | Nordhagen | G06F 16/48 |
| | | | 715/716 |
| 2013/0061266 A1* | 3/2013 | Chai | H04N 21/4821 |
| | | | 725/41 |
| 2013/0263185 A1* | 10/2013 | Wood | H04N 21/25808 |
| | | | 725/56 |
| 2014/0067623 A1* | 3/2014 | Abraham | G06Q 50/01 |
| | | | 705/27.1 |
| 2014/0123179 A1* | 5/2014 | Wang | H04N 21/4826 |
| | | | 725/37 |
| 2015/0113013 A1* | 4/2015 | Rys | H04N 21/4722 |
| | | | 707/758 |
| 2015/0172764 A1 | 6/2015 | Chae et al. | |
| 2017/0032408 A1* | 2/2017 | Kumar | H04L 67/22 |
| 2017/0171334 A1* | 6/2017 | Li | H04L 67/22 |
| 2017/0171580 A1* | 6/2017 | Hirsch | H04N 21/6125 |
| 2017/0347154 A1* | 11/2017 | Yoo | H04N 21/4668 |
| 2018/0262805 A1* | 9/2018 | Grouf | H04N 21/2665 |
| 2019/0370854 A1* | 12/2019 | Gao | H04L 67/22 |

FOREIGN PATENT DOCUMENTS

| | | |
|---|---|---|
| CN | 108491178 A | 9/2018 |
| JP | 2002014966 A | 1/2002 |
| JP | 2002044540 A | 2/2002 |
| JP | 2004023118 A | 1/2004 |
| JP | 2006303883 A | 11/2006 |
| JP | 2007189741 A | 7/2007 |
| JP | 2013149299 A | 8/2013 |
| JP | 2016537919 A | 12/2016 |

OTHER PUBLICATIONS

First Office Action in JP Patent Application No. 2019200533 dated Dec. 15, 2020.

* cited by examiner ously, when the user views the network resources on the television through the television box, the network resources for the user to select in the homepage of the television are limited, so that the user cannot select videos that he or she likes as desired, thereby reducing the user experience.

METHOD FOR PUSHING VIDEO INFORMATION, APPARATUS, DEVICE AND STORAGE MEDIUM

CROSS-REFERENCE TO RELATED APPLICATION

The present application claims priority to Chinese application number 201910004501.X, filed on Jan. 3, 2019, which is incorporated by reference in its entirety.

TECHNICAL FIELD

Embodiments of the present disclosure relate to the field of computer technologies, and in particular to a method for pushing video information, an apparatus, a device and a storage medium.

BACKGROUND

In the prior art, a television box can be installed on a television, and a user can view network resources on the television through the television box, for example, videos such as online movies, TV shows, and the like.

However, when the user views the network resources on the television through the television box, the network resources for the user to select in the homepage of the television are limited, so that the user cannot select videos that he or she likes as desired, thereby reducing the user experience.

SUMMARY

Embodiments of the present disclosure provide a method for pushing video information, an apparatus, a device and a storage medium, so that the user quickly finds a video that he or she likes in a user interface, thereby improving the user experience.

In a first aspect, an embodiment of the present disclosure provides a method for pushing video information, including:

acquiring user behavior information in a user page at a current moment;

determining, according to the user behavior information, related information of a target video that is pushed to a user terminal at a next moment; and sending the related information of the target video to the user terminal, so that the user terminal refreshes the user page according to related information of the target video.

In an implementation, the user page is displayed on the user terminal, where the user page is displayed on the user terminal, and the user page includes related information of at least one type of video at the current moment.

In an implementation, the user page is configured to sequentially display related information of a plurality of types of videos that are fixedly sorted, related information of a plurality of types of videos that are randomly sorted, and related information of a preset type of video.

In an implementation, the user page includes a plurality of option tags and related information of a preset type of video at the current moment, where each of the plurality of option tags is used to identify one content type of video.

In an implementation, the acquiring user behavior information in a user page at a current moment includes:

acquiring a selection operation performed by the user on at least one option tag of the plurality of option tags at the current moment; and the determining, according to the user behavior information, related information of a target video that is pushed to a user terminal at a next moment includes:

determining, according to the selection operation performed by the user on the at least one option tag of the plurality of option tags, the target video of the preset type that is pushed to the user terminal at the next moment.

In an implementation, the acquiring user behavior information in a user page at a current moment includes:

acquiring a voice selection instruction of the user for at least one option tag of the plurality of option tags at the current moment; and the determining, according to the user behavior information, related information of a target video that is pushed to a user terminal at a next moment includes:

determining, according to the voice selection instruction of the user for the at least one option tag of the plurality of option tags, the target video of the preset type that is pushed to the user terminal at the next moment.

In an implementation, time when the plurality of option tags are displayed in the user page is determined according to a number of times the user plays a video through the user page.

In an implementation, the plurality of option tags are periodically displayed in the user page.

In an implementation, the plurality of option tags are displayed in the user page within a preset time after the user first time plays a video through the user page.

In an implementation, the user terminal includes a television.

In an implementation, the user page is a user page that can be pulled down unlimitedly.

In a second aspect, an embodiment of the present disclosure provides an apparatus for pushing video information, including:

an acquiring module, configured to acquire user behavior information in a user page at a current moment;

a determining module, configured to determine, according to the user behavior information, related information of a target video that is pushed to a user terminal at a next moment; and a sending module, configured to send related information of the target video to the user terminal, so that the user terminal refreshes the user page according to related information of the target video.

In an implementation, the user page is displayed on the user terminal, where the user page is displayed on the user terminal, and the user page includes related information of at least one type of video at the current moment.

In an implementation, the user page is configured to sequentially display related information of a plurality of types of videos that are fixedly sorted, related information of a plurality of types of videos that are randomly sorted, and related information of a preset type of video.

In an implementation, the user page includes a plurality of option tags and related information of a preset type of video at the current moment, where each of the plurality of option tags is used to identify one content type of video.

In an implementation, when acquiring the user behavior information in the user page at the current moment, the acquiring module is specifically configured to:

acquire a selection operation performed by the user on at least one option tag of the plurality of option tags at the current moment; and when determining, according to the user behavior information, the target video that is pushed to the user terminal at the next moment, the determining module is specifically configured to:

determine, according to the selection operation performed by the user on the at least one option tag of the plurality of option tags, the target video of the preset type that is pushed to the user terminal at the next moment.

In an implementation, when acquiring the user behavior information in the user page at the current moment, the acquiring module is specifically configured to:

acquire a voice selection instruction of the user for at least one option tag of the plurality of option tags at the current moment; and when determining, according to the user behavior information, the target video that is pushed to the user terminal at the next moment, the determining module is specifically configured to:

determine, according to the voice selection instruction of the user for the at least one option tag of the plurality of option tags, the target video of the preset type that is pushed to the user terminal at the next moment.

In an implementation, time when the plurality of option tags are displayed in the user page is determined according to a number of times the user plays a video through the user page.

In an implementation, the plurality of option tags are periodically displayed in the user page.

In an implementation, the plurality of option tags are displayed in the user page within a preset time after the user first time plays a video through the user page.

In an implementation, the user terminal includes a television.

In an implementation, the user page is a user page that can be pulled down unlimitedly.

In a third aspect, an embodiment of the present disclosure provides a server, including:

a memory;

a processor; and a computer program;

where the computer program is stored in the memory and configured to be executed by the processor to implement the method according to the first aspect.

In a fourth aspect, the embodiment of the present disclosure provides a computer readable storage medium having a computer program stored thereon, the computer program, when being executed by a processor, implements the method according to the first aspect.

According to the method for pushing video information, the apparatus, the device and the storage medium provided by the embodiments of the present disclosure, the user behavior information in the user page at the current moment is acquired, and the related information of the target video that is pushed to the user terminal at the next moment is determined according to the user behavior information, so that the user terminal refreshes the user page according to the related information of the target video, thus the target video that is pushed by the server to the user terminal is more in line with the user's preference, therefore the user quickly finds the video that he/she likes in the user interface, thereby improving the user experience.

The embodiments of the present disclosure have been clearly illustrated through the previous accompanying drawings and will be described in detail below. These drawings and the written description are not intended to limit the scope of the present disclosure in any way, instead, they are intended to illustrate the concept of the present disclosure for those skilled in the art through reference to specific embodiments

DETAILED DESCRIPTION OF THE EMBODIMENTS

Exemplary embodiments, whose examples are shown in the accompanying drawings, will be described in detail herein. When the following description refers to the accompanying drawings, unless otherwise indicated, the same number in different accompanying drawings represents the same or a similar element. Embodiments described in the following exemplary embodiments do not represent all embodiments consistent with the present disclosure. Instead, they are merely examples of apparatuses and methods consistent with some aspects of the present disclosure as detailed in the appended claims.

Figure 1:
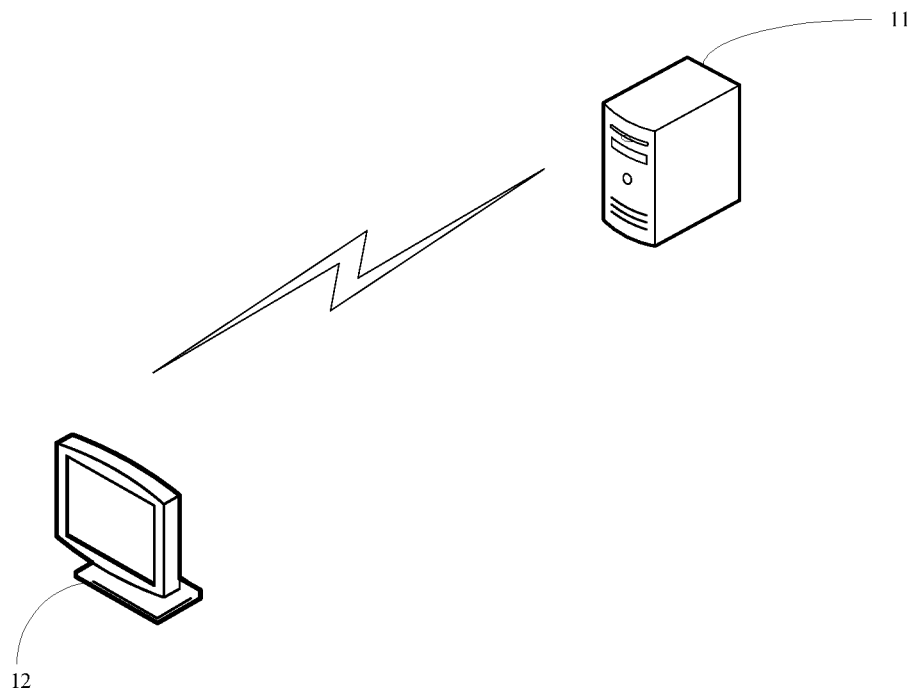
FIG. 1 is a schematic diagram of an application scenario according to an embodiment of the present disclosure.

The method for pushing video information according to the embodiments of the present disclosure may be applied to a communication system shown in FIG. 1. As shown in FIG. 1, the communication system includes: a server 11 and a terminal device 12. The server 11 may specifically be a cloud-end server. The cloud-end server, which is also referred to as a cloud server, is a server cluster with many servers. Similar to common computer architecture, the cloud server includes a processor, a hard disk, a memory, a system bus and the like. The terminal device 12 may be a user terminal such as a computer, a mobile phone, a tablet, or a television. In the embodiments, a television is taken as an example for illustration.

The method for pushing video information according to the embodiments of the present disclosure is intended to solve the above technical problems of the prior art.

The technical solutions of the present disclosure and how the technical solutions of the present application solve the above technical problems are described in detail in following specific embodiments. The following specific embodiments may be combined with each other, and same or similar concepts or processes may not be repeated in some embodiments. The embodiments of the present disclosure will be described below with reference to the accompanying drawings.

Figure 2:
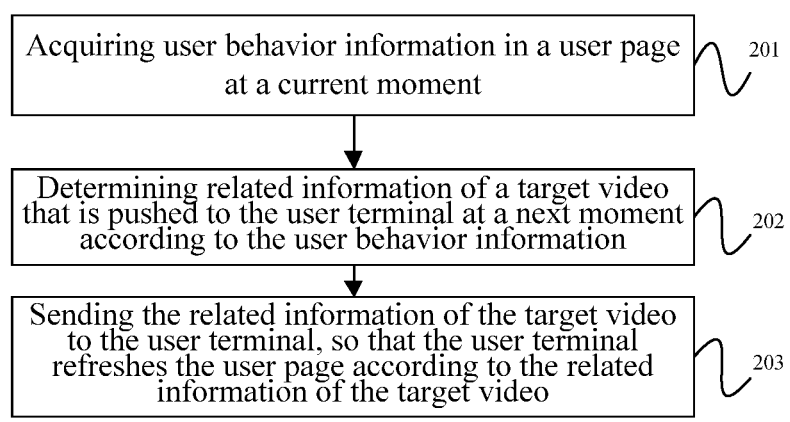
FIG. 2 is a flowchart of a method for pushing video information according to an embodiment of the present disclosure.

FIG. 2 is a flowchart of a method for pushing video information according to an embodiment of the present disclosure. This embodiment of the present disclosure provides a method for pushing video information for the above technical problems of the prior art, where the specific steps of the method are as follows:

Step 201: acquiring user behavior information in a user page at a current moment.

In an implementation, the user page is displayed on a user terminal, where the user page includes related information of at least one type of video at the current time.

Figure 3:
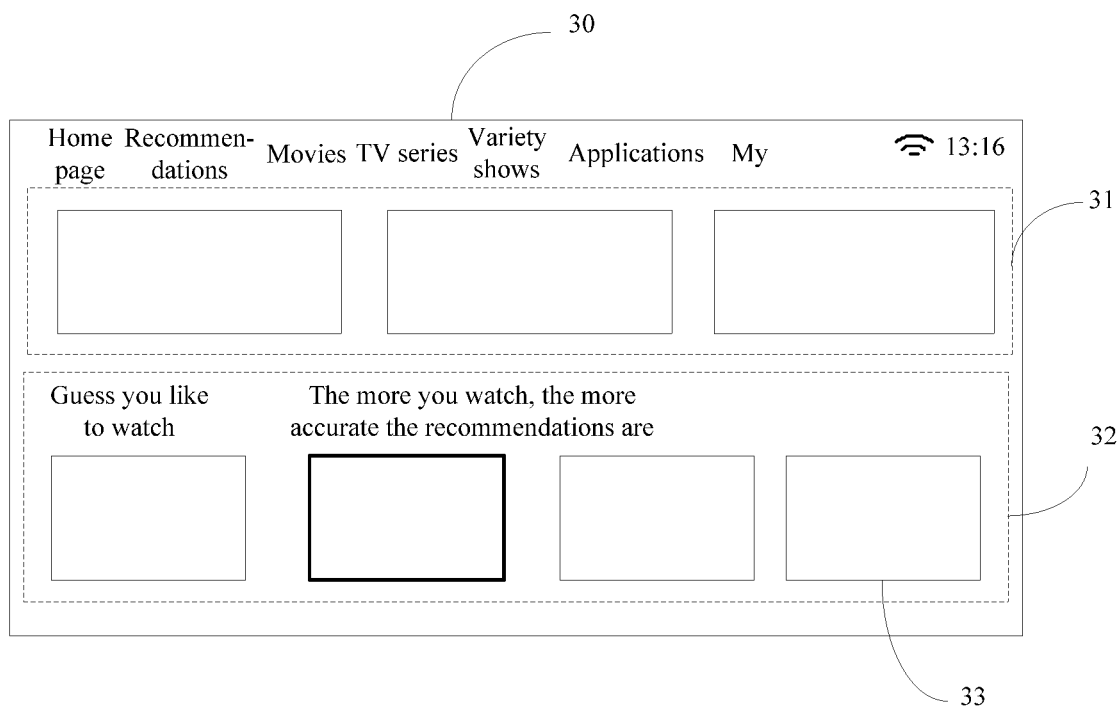
FIG. 3 is a schematic diagram of a user page according to an embodiment of the present disclosure.

In this embodiment, In an implementation, the user terminal includes a television. The user page may be a user interface on a screen of the television. As shown in FIG. 3, 30 denotes the user page on the screen of the television, where the user page may be a homepage on which related information of videos that are pushed by a server to the user is displayed. The related information of the videos may specifically include: types to which the videos belongs, the quantity of the videos, poster of the videos, titles of the videos, author information of the videos, an update identifiers of the videos, and the like. As shown in FIG. 3, a user page 30 includes an area 31 and an area 32. In an implementation, different areas may display related information of different types of videos. For example, the area 31 displays related information of one type of video, and the area 32 displays related information of another type of video. In this embodiment, an area may be referred to as a module. For example, the area 31 may be referred to as a head pushing module, and the area 32 may be referred to as a short video personalization module, that is, the video pushed in the area 31 is a head pushing video, and the video pushed in the area 32 is a personalization short video. The head pushing video may be a video that is selected from videos in the network and then pushed by the server in consideration of the historical behavior information of the user. The personalization short video may be a video that is pushed by the server according to the historical behavior information of the user. In addition, as shown in FIG. 3, a plurality of sub-areas are included within the area 31, and a plurality of sub-areas are included within the area 32 too, where a sub-area 33 is a sub-area within the area 32. In this embodiment, one sub-area may display related information of one video, or, one sub-area may display related information of a plurality of videos. In this embodiment, a sub-area may be referred to as a division block. One module may include at least one row of division blocks. One division block may display related information of one video or one audio, or one division block may also display related information of one video album or one audio album.

In this embodiment, the server may push various types of videos to the user, for example, short videos, long videos, small videos, and the like. Long videos refer to movies, TV series, variety shows, animations, documentaries, etc., short videos refer to videos other than long videos, and small videos are short videos that can be played in portrait. In addition, in other embodiments, the server is not limited to pushing videos to the television, but the server may also push an audio such as music and an audiobook to the television.

In an implementation, the user page is a user page that can be pulled down unlimitedly. The user page may display a plurality of modules, and different modules are configured to display related information of different types of videos. Each module may include a plurality of division blocks.

Figure 4:
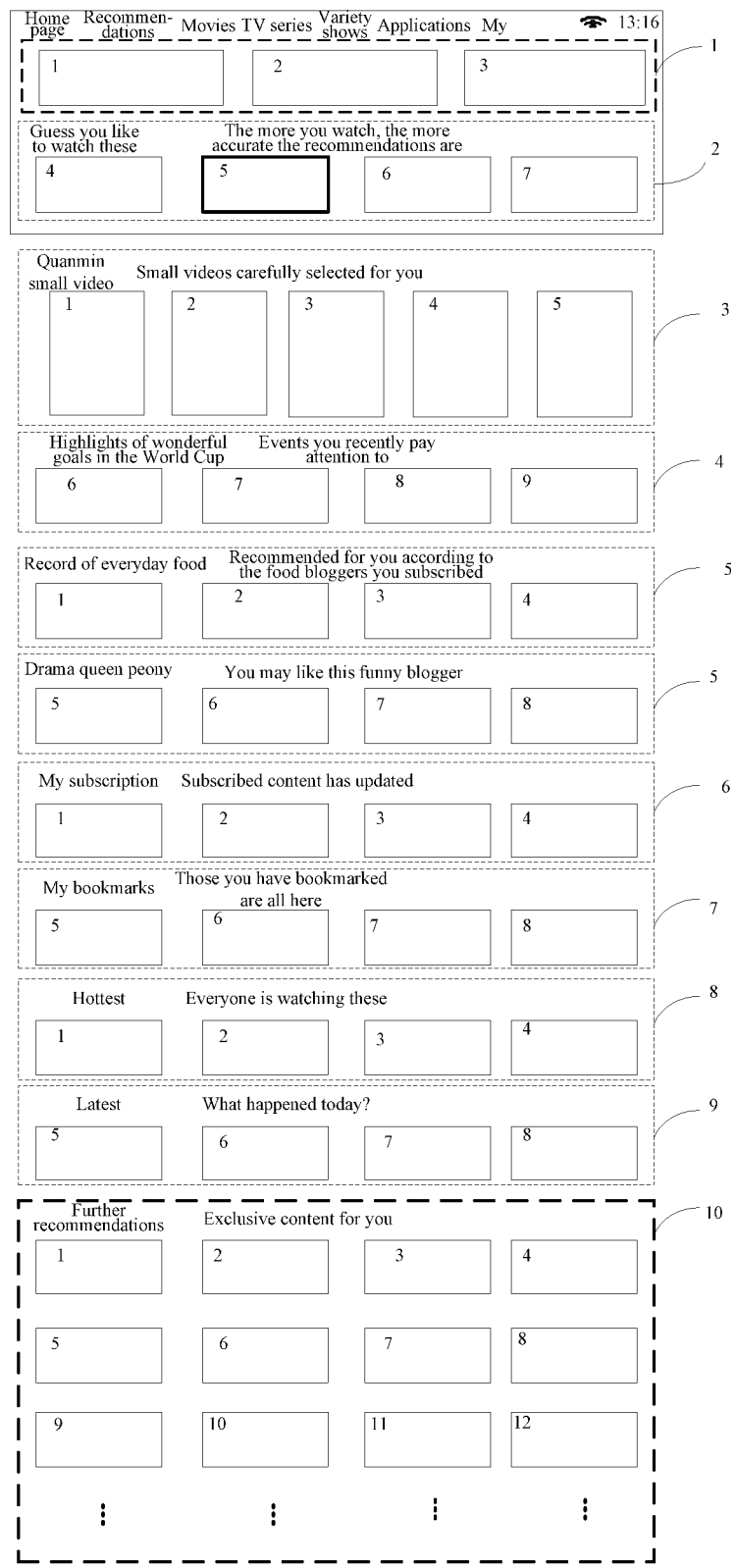
FIG. 4 is a schematic diagram of another user page according to an embodiment of the present disclosure.

As shown in FIG. 4, a module 1 corresponds to a head recommendation module, a module 2 corresponds to a short video personalization module, a module 3 corresponds to a small video personalization module, a module 4 corresponds to an album personalization module, a module 5 corresponds to an author personalization module, a module 6 corresponds to a my subscription module, a module 7 corresponds to a my bookmark module, a module 8 corresponds to a hottest module, a module 9 corresponds to a latest module, and a module 10 corresponds to a short video personalization module that can be pulled down unlimitedly.

For example, the module 1 and the module 2 are displayed in the current page, and when the user browses to a certain division block in the last row of the current page, that is, a certain division block in the module 2, if the user continues to move a selection box downward, the module 3 and the module 4 will be displayed in the current page. Similarly, when the user browses again to a division block in the last row of the current page, that is, a division block in the module 4, if the user continues to move the selection box downward, the module 5 will be displayed in the current page, and so on, until the module 10 is displayed in the current page. In an implementation, the module 10 may display N rows of related information of videos, where theoretically N=∞, thereby ensuring that the current page is a page that can be pulled down unlimitedly. In addition, it should be noted that being able to be pulled down unlimitedly means that during a process of the user continually pulling down the current page through a remote control, a touch control manner or a voice control manner, the current page would continually display new division blocks (i.e., new related information of videos) instead of cyclically displaying division blocks that have already been displayed.

In an implementation, the user can browse and click on the related information of the videos in the current page. After the user clicks on the related information of a video on a certain division block, the current page may be switched to a corresponding play page of the video. In the play page, the user may perform an operation of bookmarking on the video, or perform an operation of subscribing on the author corresponding to the video. The television may acquire the behavior information of the user in the current page, for example, operations such as browsing, clicking, playing, bookmarking, and subscribing on the video as well as the time of these operations, and send the behavior information to the server.

Step 202: determining related information of a target video that is pushed to the user terminal at a next moment according to the user behavior information.

The server may determine the related information of the target video that is pushed to the user at the next moment according to the user behavior information, for example, the operations such as browsing, clicking, playing, bookmarking, and subscribing on the video in the user page at the current moment. The related information of the target video may specifically be a poster, a title, author information and the like corresponding to the target video. For example, the module 1 and the module 2 are displayed in the current page, and the server may determine related information of a video to be displayed of each division block in the module 3 and the module 4, according to the operations, performed by the user, such as browsing and clicking on the division blocks in the module 1 and the module 2 in the current page as well as playing, bookmarking and subscribing on a corresponding video after a division block is clicked.

Step 203: sending the related information of the target video to the user terminal, so that the user terminal refreshes the user page according to the related information of the target video.

For example, the server sends the related information of the video to be displayed in each division block in the module 3 and the module 4 that is determined by the server to the television. When the television determines that the user has browsed to a certain division block of the last row in the current page, that is, a certain division block in the module 2, and continues to move the selection box downward, the user page is refreshed according to the related information of the video to be displayed of each division block in the module 3 and the module 4, so that the user page displays the module 3 and the module 4 instead of still displaying the module 1 and the module 2. The display process of modules after the module 3 and the module 4 in the user page is in a similar way and will not be repeated herein.

In this embodiment, the user behavior information in the user page at the current moment is acquired, and the related information of the target video that is pushed to the user terminal at the next moment is determined according to the user behavior information, so that the user terminal refreshes the user page according to the related information of the target video, thus the target video that is pushed by the server to the user terminal is more in line with the user's preference, therefore the user quickly finds the video that he/she likes in the user interface, thereby improving the user experience.

Figure 5:
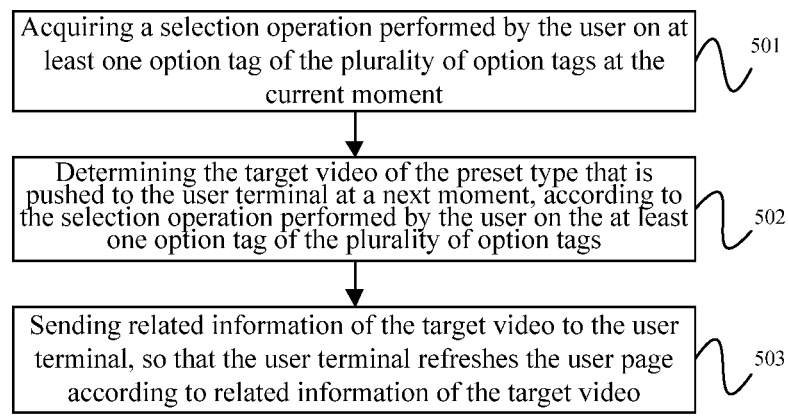
FIG. 5 is a flowchart of a method for pushing video information according to another embodiment of the present disclosure.

FIG. 5 is a flowchart of a method for pushing video information according to another embodiment of the present disclosure. In an implementation, the user page is configured to sequentially display related information of a plurality of types of videos that are fixedly sorted, related information of a plurality of types of videos that are randomly sorted, and related information of a preset type of video.

Figure 6:
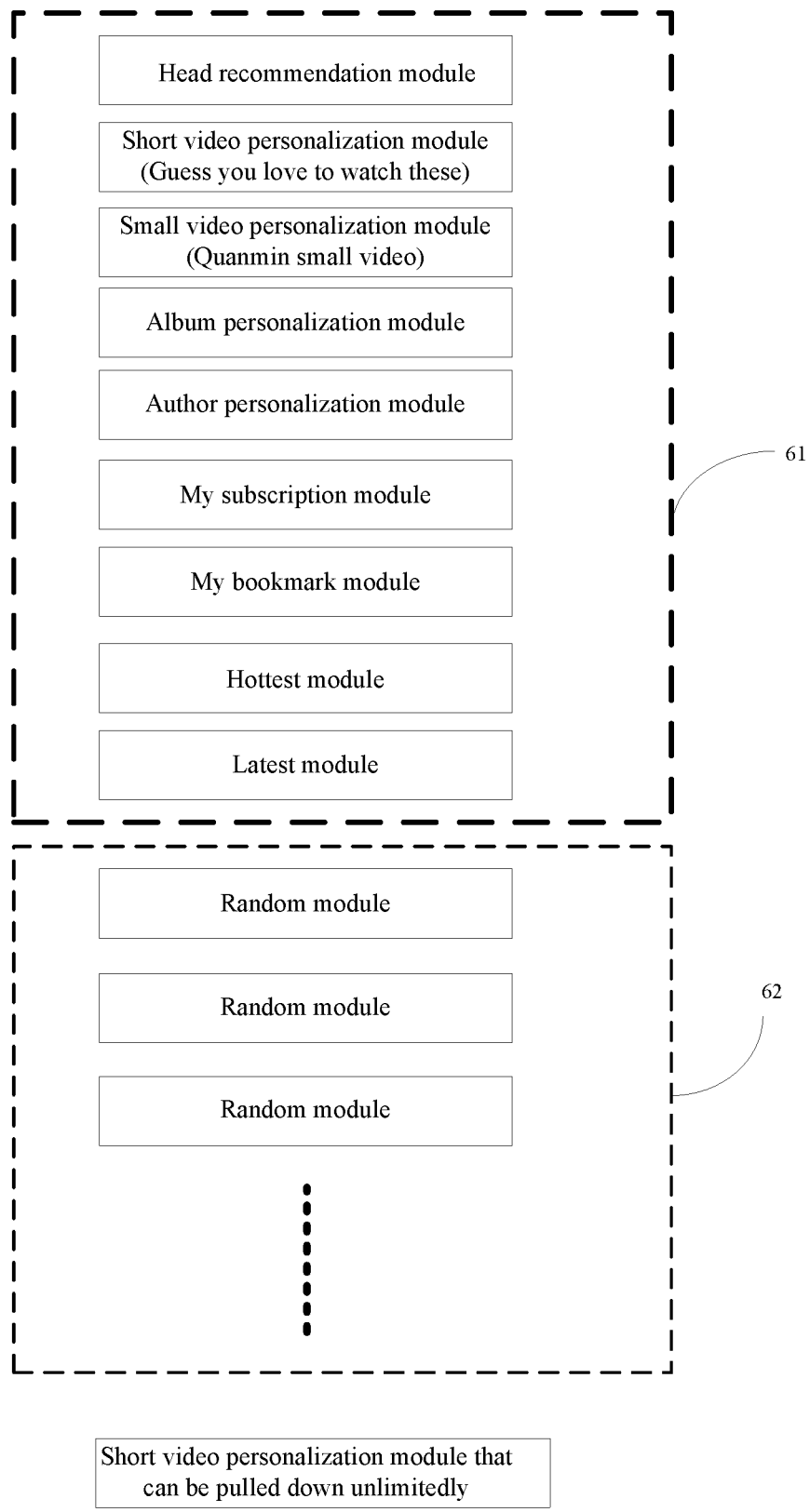
FIG. 6 is a schematic diagram of another user page according to an embodiment of the present disclosure.

In this embodiment, as shown in FIG. 6, the user page may sequentially display a head recommendation module, a short video personalization module, a small video personalization module, an album personalization module, an author personalization module, a my subscription module, a my bookmark module, a hottest module and a latest module. The my bookmark module may display related information of videos that the user has bookmarked. In an implementation, if the user has not bookmarked a video, the user page may not display the my bookmark module. In addition, if the videos bookmarked by the user are not enough to fill one row when being displayed, the user page may not display the my bookmark module. If the videos bookmarked by the user are enough to fill one row when being displayed, the related information of the videos that are recently bookmarked by the user may be displayed at the front of the my bookmark module.

In this embodiment, the display order of a plurality of modules in a dashed box 61 shown in FIG. 6 may be fixed. In addition, after the user page has displayed the plurality of modules in the dashed box 61, if the user continues to browse the user page downward, the user page may also display a plurality of random modules in a dashed box 62. In an implementation, each random module may be any one of a short video personalization module, a small video personalization module, an album personalization module, an author personalization module, a hottest module, and a latest module. However, in the dashed box 62, each two adjacent random modules need to be different. In this embodiment, the number of random modules in the dashed box 62 is not limited. It can be understood that a random module is any one of a short video personalization module, a small video personalization module, an album personalization module, an author personalization module, a hottest module, and a latest module, for example, the random module is a short video personalization module, however, the related information of the video displayed in the random module is different from the related information of the video displayed in the short video personalization module, that is, the random module and the short video personalization module both display personalization short videos, but the short video corresponding to the random module and the short video corresponding to the short video personalization module are different. After the user page has displayed the plurality of random modules in the dashed box 62, if the user continues to browse the user page downward, the user page may continue to display the related information of the preset type of video, such as a short video personalization module that can be pulled down unlimitedly, where the short video personalization module that can be pulled down unlimitedly is specifically as the module 10 shown in FIG. 4, and details are not described herein again.

Figure 7:
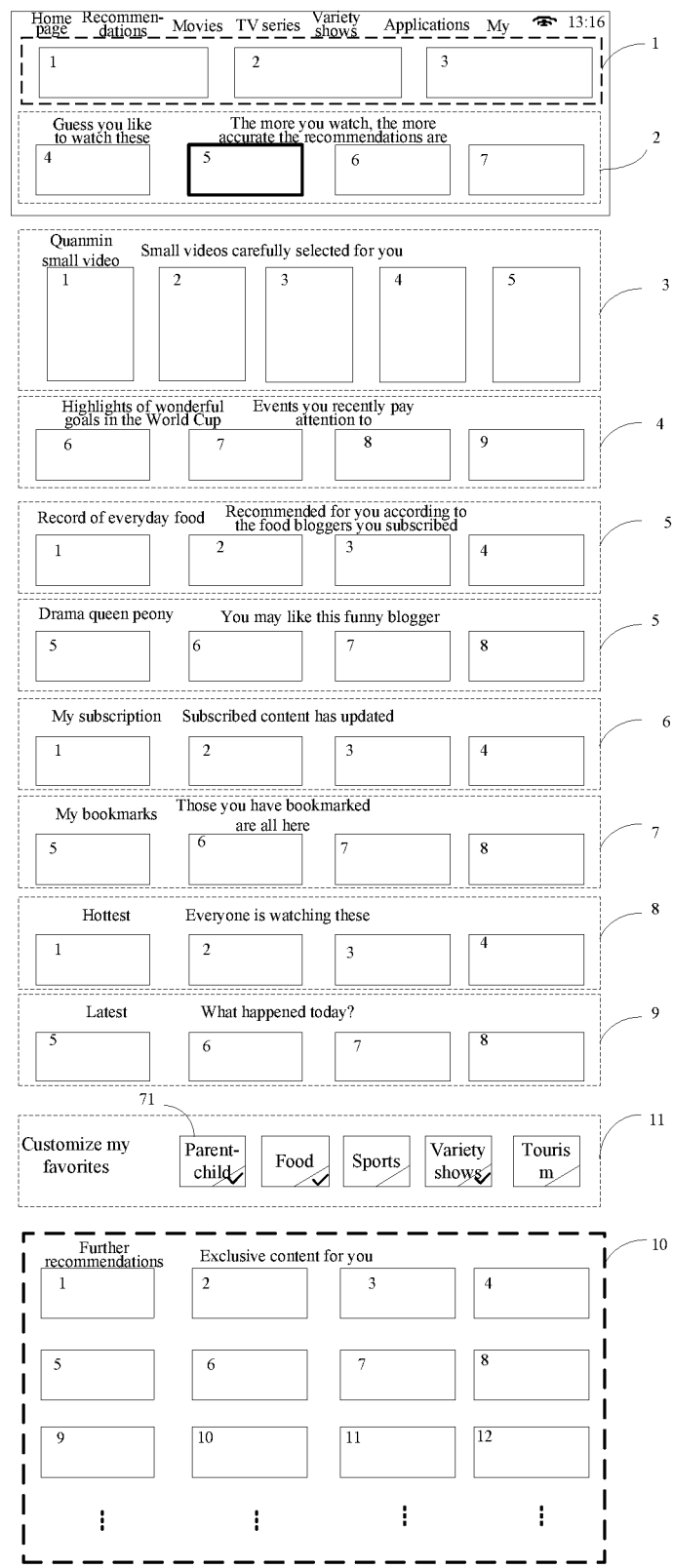
FIG. 7 is a schematic diagram of another user page according to an embodiment of the present disclosure.

On the basis of FIG. 4 or FIG. 6, a customization tag module may be disposed above the module 10 or the short video personalization module that can be pulled down unlimitedly. For example, on the basis of FIG. 4, a customization tag module 11 may be disposed above the module 10. As shown in FIG. 7, the customization tag module 11 includes a module title "customize my favorites" and a plurality of option tags. 71 denotes one of the plurality of option tags. Each option tag is used to identify one type of video of content, for example, the option tag 71 is used to identify a parent-child type of video. The user may check at least one of the plurality of option tags according to his/her personal preference, for example, the user checks the option tags of parent-child, food, variety show. In other embodiments, the user may also not check the option tags shown in FIG. 7.

In an implementation, time when the plurality of option tags are displayed in the user page is determined according to the number of times the user plays a video through the user page. That is, the plurality of option tags as shown in FIG. 7 do not always appear in the user page, instead, the time when the plurality of option tags are displayed in the user page is determined according to the number of times the user plays the video through the user page.

In one implementation, the plurality of option tags are displayed in the user page within a preset time after the user plays a video through the user page for the first time. For example, the user page will display the plurality of option tags when the user browses the user page, within a week after the user first time plays the video through the user page, or, the user page displays the plurality of option tags within a month after the user first time plays the video through the user page.

In another implementation, the plurality of option tags are periodically displayed in the user page. For example, when the number of times the user plays the video through the user page is greater than a preset number of times, the user page periodically displays the plurality of option tags, for example, the customization tag module 11 shown in FIG. 7 is displayed every two months.

In addition, in some embodiments, if the user does not check the option tag, the customization tag module 11 disappears after appearing in the user page for three consecutive days. In addition, the plurality of option tags displayed in the user page each time may be completely different, or partially the same, or completely the same. When the plurality of option tags displayed in the user page each time are partially the same, the video content that the user likes can be acquired more accurately.

Figure 8:
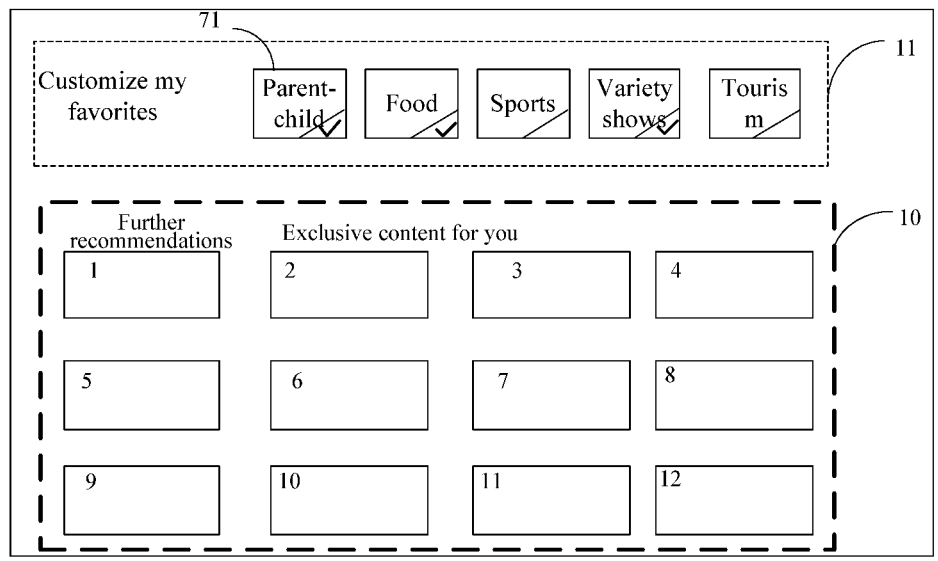
FIG. 8 is a schematic diagram of another user page according to an embodiment of the present disclosure.

In an implementation, the user page includes the plurality of option tags and the related information of the preset type of video at the current moment, and each of the plurality of option tags is used to identify one content type of video. As shown in FIG. 8, it is assumed that the user page includes the customization tag module 11 and the module 10 shown in FIG. 7 at the current moment, the module 10 is specifically a short video personalization module, that is, the module 10 displays related information of a short video, and the module 10 can be unlimitedly pulled down. As shown in FIG. 8, at the current moment, the module 10 displays related information of 12 short videos.

On the basis of the foregoing embodiment, the method for pushing video information according to this embodiment specifically includes following steps as shown in FIG. 5:

Step 501: acquiring a selection operation performed by the user on at least one option tag of the plurality of option tags at the current moment.

As shown in FIG. 8, the user terminal acquires the selection operation performed by the user on at least one option tag of the multiple option tags at the current moment. For example, the user checks option tags of parent-child, food, and variety shows. Further, the user terminal sends the video contents identified by the option tags selected by the user to the server.

Step 502: determining the target video of the preset type that is pushed to the user terminal at a next moment, according to the selection operation performed by the user on the at least one option tag of the plurality of option tags.

The server determines, according to the video content identified by the option tag selected by the user, the target short video that is pushed to the user terminal at next time. For example, the user checks the option tags of parent-child, food, and variety show, the target short videos that are pushed to the user terminal at the next moment mainly include short videos of parent-child, food, and variety.

Step 503: sending related information of the target video to the user terminal, so that the user terminal refreshes the user page according to related information of the target video.

The server sends the related information of the target short video to the user terminal, and the user terminal updates the module 10 to the related information of the target short video.

In other embodiments, as another possible implementation, the acquiring user behavior information in a user page at a current moment includes: acquiring a voice selection instruction of the user for at least one option tag of the plurality of option tags at a current moment; and the determining a target video that is pushed to the user terminal at a next moment according to the user behavior information includes: determining the target video of the preset type that is pushed to the user terminal at the next moment according to the voice selection instruction of the user for the at least one option tag of the plurality of option tags.

As shown in FIG. 8, the user page displays a plurality of option tags, for example, parent-child, food, sports, variety show, tourism, etc., the user may select at least one option tag of the plurality of option tags by the voice selection instruction, for example, the user sends a voice selection instruction of "selecting parent-child, food, variety show" to the television. After the television detects the voice selection instruction of the user for the option tags of parent-child, food and variety show, the voice selection instruction is sent to the server, and the server determines, according to the voice selection instruction, the target video that is pushed to the television at the next moment, the target video may specifically be a short video of parent-child, food, or variety show.

In this embodiment, the user behavior information in the user page at the current moment is acquired, and the related information of the target video that is pushed to the user terminal at the next moment is determined according to the user behavior information, so that the user terminal refreshes the user page according to the related information of the target video, thus the target video that is pushed by the server to the user terminal is more in line with the user's preference, therefore the user quickly finds the video that he/she likes in the user interface, thereby improving the user experience.

Figure 9:
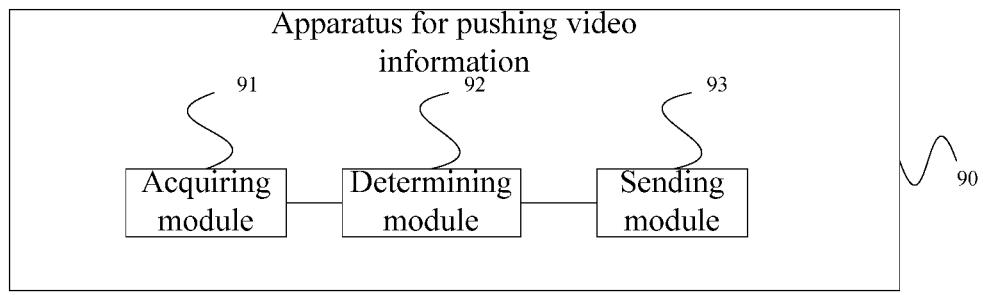
FIG. 9 is a schematic structural diagram of an apparatus for pushing video information according to an embodiment of the present disclosure.

FIG. 9 is a schematic structural diagram of an apparatus for pushing video information according to an embodiment of the present disclosure. The apparatus for pushing video information may specifically be the server in the foregoing embodiments, or a component of the server (for example, a chip or a circuit). The apparatus for pushing video information according to this embodiment of the present disclosure may perform the processing flow according to the embodiments of the method for pushing video information. As shown in FIG. 9, an apparatus for pushing video information 90 includes: an acquiring module 91, a determining module 92, and a sending module 93. The acquiring module 91 is configured to acquire user behavior information in a user page at a current moment; the determining module 92 is configured to determine, according to the user behavior information, related information of a target video that is pushed to a user terminal at a next moment; the sending module 93 is configured to send the related information of the target video to the user terminal, so that the user terminal refreshes the user page according to the related information of the target video.

In an implementation, the user page is displayed on the user terminal, and the user page includes related information of at least one type of video at the current moment.

In an implementation, the user page is configured to sequentially display related information of a plurality of types of videos that are fixedly sorted, related information of a plurality of types of videos that are randomly sorted, and related information of a preset type of video.

In an implementation, the user page includes a plurality of option tags and related information of a preset type of videos at the current moment, and each of the plurality of option tags is used to identify one content type of video.

In an implementation, when acquiring the user behavior information in the user page at the current moment, the acquiring module 91 is specifically configured to: acquire a selection operation performed by the user on at least one option tag of the plurality of option tags at the current moment; and when determining, according to the user behavior information, the target video that is pushed to the user terminal at the next moment, the determining module 92 is specifically configured to: determine, according to the selection operation performed by the user on the at least one option tag of the plurality of option tags, the target video of the preset type that is pushed to the user terminal at the next moment.

In an implementation, when acquiring the user behavior information in the user page at the current moment, the acquiring module 91 is specifically configured to: acquire a voice selection instruction of the user for at least one option tag of the plurality of option tags at the current moment; and when determining, according to the user behavior information, the target video that is pushed to the user terminal at the next moment, the determining module 92 is specifically configured to: determine, according to the voice selection instruction of the user for the at least one option tag of the plurality of option tags, the target video of the preset type that is pushed to the user terminal at the next moment.

In an implementation, time when the plurality of option tags are displayed in the user page is determined according to a number of times the user plays a video through the user page.

In an implementation, the plurality of option tags are periodically displayed in the user page.

In an implementation, the plurality of option tags are displayed in the user page within a preset time after the user first time plays a video through the user page.

In an implementation, the user terminal includes a television.

In an implementation, the user page is a user page that can be pulled down unlimitedly.

The apparatus for pushing video information according to the embodiment shown in FIG. 9 can be used to implement the technical solutions of the foregoing method embodiments, where the implementation principle and technical effects are similar, and will not be repeated herein.

Figure 10:
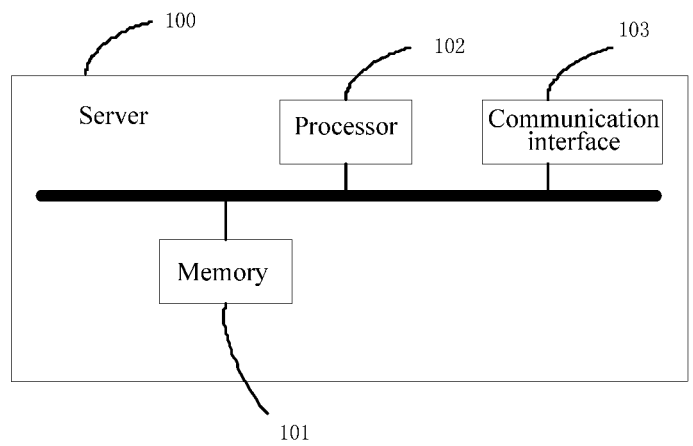
FIG. 10 is a schematic structural diagram of a server according to an embodiment of the present disclosure.

FIG. 10 is a schematic structural diagram of a server according to an embodiment of the present disclosure. The server according to this embodiment of the present disclosure can implement the processing flow according to the embodiments of the method for pushing video information. As shown in FIG. 10, the server 100 includes: a memory 101, a processor 102, a computer program, and a communication interface 103. The computer program is stored in the memory 101 and configured to be executed by the processor 102 to implement the method for pushing video information described in the above embodiments.

The server according to the embodiment shown in FIG. 10 can be used to implement the technical solutions of the foregoing method embodiments, where the implementation principle and technical effects are similar, and will not be repeated herein.

In addition, the embodiment of the present disclosure further provides a computer readable storage medium having a computer program stored thereon, the computer program being executed by the processor to implement the method for pushing video information described in the foregoing embodiments.

In the embodiments according to the present application, it should be understood that the disclosed apparatuses and methods may be implemented in other manners. For example, the apparatus embodiments described above are merely illustrative. For example, the division of the unit is only a division of logical functions. In actual implementations, there may be another division manner, for example, multiple units or components may be combined or integrated into another system, or some features can be omitted or not executed. In addition, the mutual coupling or direct coupling or communication connection shown or discussed may be an indirect coupling or communication connection through some interfaces, devices or units, and may be in an electrical, a mechanical or other form.

The units described as separate components may or may not be physically separated, and the components illustrated as units may or may not be physical units, that is, may be located in one place, or may be distributed to multiple network units. Some or all of the units may be selected according to actual needs to achieve the purpose of the solutions of the embodiment.

In addition, various functional units in various embodiments of the present application may be integrated into one processing unit, or various units may exist physically separately, or two or more units may be integrated into one unit. The above integrated units may be implemented in the form of hardware or in the form of hardware and software functional units.

The above-described integrated unit implemented in the form of a software functional unit can be stored in a computer readable storage medium. The above software functional unit is stored in a storage medium and includes several instructions to cause a computer device (which may be a personal computer, a server, or a network device, etc.) or a processor to perform some of the steps of the methods of the various embodiments of the present application. The above-mentioned storage medium includes: a U disk, a mobile hard disk, a read-only memory (ROM), a random access memory (RAM), a magnetic disk, or an optical disk, etc., which can store program codes.

A person skilled in the art can clearly understand that for the convenience and brevity of the description, the division of each functional module described above is only for exemplifying. In practical applications, the above functions may be assigned to be implemented by different functional modules as needed, that is, the internal structure of the apparatus is divided into different functional modules to perform all or part of the functions described above. For the specific working processes of the apparatuses described above, reference can be made to the corresponding processes in the foregoing method embodiments, which will not be repeated herein.

Finally, it should be noted that the above embodiments are merely for illustrating, instead of limiting, the technical solutions of the present application. Although the present application has been illustrated in detail with reference to the above embodiments, a person ordinarily skilled in the art should understand the technical solutions described in the above embodiments may be modified or equivalently substituted for some or all of the technical features, and the modifications and substitutions should do not cause the essence of the corresponding technical solutions depart from the scope of the technical solutions of the embodiments of the present application.

What is claimed is:

1. A method for pushing video information, comprising:
determining whether a selection operation is performed by a user on at least one option tag of a plurality of option tags displayed on a user page at a current moment, wherein the user page comprises the plurality of option tags and related information of videos of a preset type at the current moment, and each of the plurality of option tags is used to identify one content type of video, different option tags identify different content types, wherein the videos of the preset type are short videos or long videos, and the long videos and the short videos refer to two types of videos with different playback durations;
in response to determining that the selection operation is performed by the user, acquiring the selected at least one option tag; determining, according to the selected at least one option tag and the related information of videos of the preset type at the current moment, related information of a target video to be pushed to a user terminal at a next moment; and sending the related information of the target video to the user terminal, so that the user terminal refreshes the user page according to related information of the target video; and in response to determining that the selection operation is not performed by the user, removing the plurality of option tags from the user page after a predefined time;

wherein the determining, according to the selected at least one option tag and the related information of videos of the preset type at the current moment, related information of a target video to be pushed to a user terminal at a next moment comprises:

determining, according to the content type identified by the selected at least one option tag and playback durations of the videos of the preset type, the target video to be pushed to the user terminal at the next moment, wherein the target video is a short video or a long video, and has a content type as same as the content type identified by the selected at least one option tag; and determining, according to the target video, the related information of the target video.

2. The method according to claim 1, wherein the user page is displayed on the user terminal, and the user page comprises related information of at least one type of video at the current moment.

3. The method according to claim 1, wherein the user page is configured to sequentially display related information of a plurality of types of videos that are fixedly sorted, related information of a plurality of types of videos that are randomly sorted, and related information of a preset type of video.

4. The method according to claim 1, wherein time when the plurality of option tags are displayed in the user page is determined according to a number of times of videos played through the user page.

5. The method according to claim 4, wherein when the number of times of videos played through the user page is greater than a preset number of times, the plurality of option tags are displayed at predetermined intervals in the user page.

6. The method according to claim 4, wherein the plurality of option tags are displayed in the user page within a preset time after the user plays a video for a first time through the user page.

7. The method according to claim 1, wherein the user terminal comprises a television.

8. The method according to claim 1, wherein the user page is a user page that can be pulled down unlimitedly.

9. The method according to claim 1, wherein the option tag comprises at least one of parent-child, food and variety show.

10. A non-transitory computer readable storage medium having a computer program stored thereon, wherein the computer program, when being executed by a processor, implements the method according to claim 1.

11. An apparatus for pushing video information, comprising:
 a memory;
 a processor; and
 a computer program;
 wherein the computer program is stored in the memory, and the processor executes the computer program to:

determine whether a selection operation is performed by a user on at least one option tag of a plurality of option tags displayed on a user page at a current moment, wherein the user page comprises the plurality of option tags and related information of videos of a preset type at the current moment, and each of the plurality of option tags is used to identify one content type of video, different option tags identify different content types, wherein the videos of the preset type are short videos or long videos, and the long videos and the short videos refer to two types of videos with different playback durations;

in response to determining that the selection operation is performed by the user, the processor executes the computer program to: acquire the selected at least one option tag; determine, according to the selected at least one option tag and the related information of videos of the preset type at the current moment, related information of a target video to be pushed to a user terminal at a next moment; and send related information of the target video to the user terminal, so that the user terminal refreshes the user page according to related information of the target video;

in response to determining that the selection operation is not performed by the user, remove the plurality of option tags from the user page after a predefined time;

wherein when determining, according to the selected at least one option tag and the related information of videos of the preset type at the current moment, the target video to be pushed to the user terminal at the next moment, the processor executes the computer program to:

determine, according to the content type identified by the selected at least one option tag and playback durations of the videos of the preset type, the target video to be pushed to the user terminal at the next moment, wherein the target video is a short video or a long video and has a content type as same as the content type identified by the selected at least one option tag; and determine, according to the target video, the related information of the target video.

12. The apparatus for pushing video information according to claim 11, wherein the user page is displayed on the user terminal, and the user page comprises related information of at least one type of video at the current moment.

13. The apparatus for pushing video information according to claim 11, wherein the user page is configured to sequentially display related information of a plurality of types of videos that are fixedly sorted, related information of a plurality of types of videos that are randomly sorted, and related information of a preset type of video.

14. The apparatus for pushing video information according to claim 11, wherein time when the plurality of option tags are displayed in the user page is determined according to a number of times of videos played through the user page.

15. The apparatus for pushing video information according to claim 14, wherein when the number of times of videos played through the user page is greater than a preset number of times, the plurality of option tags are displayed at predetermined intervals in the user page.

* * * * *